Patented July 14, 1953

2,645,581

UNITED STATES PATENT OFFICE 2,645,581

ANTIOXIDANT SALT AND METHOD OF PREPARING THE SAME

Clinton S. Robison, Chicago, Ill., assignor to Morton Salt Company, Chicago, Ill., a corporation of Illinois No Drawing. Application April 26, 1949, Serial No. 89,811

7 Claims. (Cl. 99—143)

This invention relates to the stabilization of fat-containing food products against rancidity development, and is particularly directed to the stabilization of nuts, potato chips and like fried foods, as well as nut spreads, nut butters, and dairy products, such as butter and the like, whose manufacture includes the addition thereto of common salt, as a flavoring or preserving agent.

While antioxidants are known which will retard the development of rancidity in fats, many of these antioxidants lose their effectiveness when the fat, containing the antioxidant, is subjected to elevated temperatures, as during frying. Thus, potato chips or nuts, for example, fried or blanched in antioxidant-containing fat, will be little, if any more stable than when fried or blanched in an antioxidant-free fat. The addition of an antioxidant to fried foods of this nature, after the frying step, presents difficulties, due to the fact that only very small quantities of antioxidants percentagewise are permitted to be used, and the uniform distribution of such small quantities over the surface of the fried food is, practically, a difficult matter indeed.

Coupled with the known fact of antioxidant loss through frying is the, likewise, well known fact that salt has a pro-oxidant effect on fats when in contact therewith. This is a particularly important matter, as will be clearly appreciated, in the case of nuts and potato chips, since, after being fried, these foods are sprinkled or dusted with salt.

The main object of the present invention is to provide a means for stabilizing fatty food products, containing salt. Another object is to provide an anti-oxidant composition suitable for use with foods which are to be salted. Further object is to provide a novel means for stabilizing food products, such as roasted nuts, potato chips and the like.

The compound known as nordihydroguaiaretic acid is an excellent anti-oxidant and has been used successfully to preserve fats, as well as fat-containing foods from the premature development of rancidity. The present invention contemplates an antioxidant composition comprising salt, such as common table salt, and other materials, including nordihydroguaiaretic acid, a synergist for the latter and an edible waxy, normally solid compound possessing one or more free hydroxyl groups.

In preparing the preferred form of the composition of my invention, glyceryl monostearate is saturated with nordihydroguaiaretic acid and is then mechanically mixed with sodium chloride. The saturation of the glyceryl monostearate with nordihydroguaiaretic acid is accomplished while the monostearate is in a molten state, preferably at a temperature between 145° F. and about 160° F. On cooling and on the resultant solidification of the material, it is powdered and then added to the salt, the mixing operation being carried out at a temperature above the melting point of glyceryl monostearate so as to provide a more uniform dispersion of the salt crystals in the material. Citric acid in powdered form is then added to the mixture. The resultant composition has been found to be tremendously valuable with respect to its rancidity inhibiting powers, particularly when used with products such as potato chips, salted nuts, peanut butter, butter and similar materials. Use of the present composition in lieu of common salt for these foods has been found to result in increasing the keeping time of such foods many fold.

An important aspect of the present invention lies in the concept of providing an antioxidant salt characterized by the fact that the salt crystals have plated thereon a thin film of glycerol monostearate containing nordihydroguaiaretic acid which has been dissolved therein. Preferably, an acid synergist, such as citric acid, is also added in an amount sufficient not only to neutralize the alkalinity of the salt, but to contribute a synergistic effect. The hydrophilic and oleophilic properties of glycerol monostearate and similar aliphatic compounds having a free hydroxyl group, not only imparts better flow characteristics to the salt, but furthermore, I have discovered that nordihydroguaiaretic acid is soluble in glycerol monostearate at much lower temperatures than is the case with other fatty materials. For example, I have found that while a given amount of nordihydroguaiaretic acid will dissolve in glyceryl monostearate at about 145° F., the same amount will dissolve in other fatty materials, such as tri-glycerides, only at a temperature of around 240° F. Such a high processing temperature is undesirable for the purpose of the present invention, since it results in a darkening of the fat and a destruction of its natural flavor. The use of glycerol monostearate as a carrier for the nordihydroguaiaretic acid eliminates this undesirable characteristic of other fatty materials.

The following example of one method of preparing the composition of the present invention is given by way of illustration only and is not to be limited thereto, since variations within the skill of the art will suggest themselves.

Example

It is desirable to have the compounding of the present composition performed in a series of three steps, as follows:

1. *Preparation of solution.*—A solution of nordihydroguaiaretic acid and glyceryl monostearate is made up so as to have the following composition:

| | Per cent |
|---|---|
| Glyceryl monostearate | 80 |
| Nordihydroguaiaretic acid | 20 |

The glyceryl monostearate is heated to a liquid condition, at least 145° F. and the nordihydroguaiaretic acid is added to the melted stearate accompanied by continuous agitation. The mixture is allowed to solidify and is then used in step 2, as follows:

2. *Compounding of a "mother batch."*—The composition of a "mother batch" is as follows: nordihydroguaiaretic acid and glycerol monostearate solution as prepared above, 7.5%, and flake flour salt, 92.5%. In preparing the "mother batch," the mixture of nordihydroguaiaretic acid and glyceryl monostearate prepared as above described is added to the salt which has been heated to between 145° F. and 160° F., and the aggregate mixed until uniform. Preferably, the product is kept under agitation until a temperature of about 140° F. or even lower is obtained.

3. *Compounding of the finished product.*—The finished product has the following composition: Flake flour salt—98.99%, "mother batch"—1.000%, citric acid not less than .003%. The preferred mixing procedure is as follows: the flake flour salt must be heated to a temperature between 145° F. and 160° F. when the mother batch is added, accompanied by agitation. The citric acid in powdered form is now also added and the product agitated again until a resultant temperature of 140° F. or lower is obtained. The product is now ready for use.

The mother batch which is added to the finished product should, preferably, not be less than about 1%, nor greater than about 1.5%, while the citric acid should be between about .003% and .01%. The remainder is salt.

The novel composition of the present invention provides a simple and effective means for protecting fatty foods, which are to be salted, against rancidity development, and is effective not only in cases where a topical application of salt is required, as with potato chips, but also with those foods which require the incorporation of salt into the food, as with peanut butter and similar products.

It will be seen by those skilled in the art that many variations and changes within the scope of the invention may be readily made. For example, while nordihydroguaiaretic acid is the preferred anti-oxidant, other anti-oxidant materials which have a similar solubility in glyceryl monostearate may also be used, providing, of course, that they are not toxic, substantially odorless and colorless. Likewise, though the preferred carrier for the nordihydroguaiaretic acid is glyceryl monostearate, other materials may be used, for example, glyceryl distearate and similar compounds, providing that they have substantially similar solvent characteristics to glyceryl monostearate, and further providing that there is at least one free hydroxyl group in the compound. Of course, the solvent characteristics should be such as to approximate those of glyceryl monostearate, with respect to the solution therein of compounds, such as nordihydroguaiaretic acid. Furthermore, while the preferred synergist to be used with the present preferred composition is citric acid, other acids synergists, such as phosphoric acid, may be used.

I claim:

1. A composition for salting and stabilizing fatty foods against rancidity comprising common salt in crystal form, having substantially all of the surfaces of said salt crystals coated with a thin layer of glyceryl monostearate having dissolved therein an effective amount of nordihydroguaiaretic acid, and an acid synergist therefor.

2. A composition for salting and stabilizing fat-containing foods against rancidity development, comprising common salt having the surfaces thereof coated with a thin layer of a partially stearated glycerol having one or more free hydroxyl groups, said material containing nordihydroguaiaretic acid dissolved therein, and a synergist for the nordihydroguaiaretic acid.

3. A sensibly dry composition for salting and stabilizing fat-containing foods comprising common salt in crystal form having the surfaces thereof coated with a thin layer of a partially stearated glycerol having one or more free hydroxyl groups, said material containing nordihydroguaiaretic acid dissolved therein, and a synergistically effective amount of citric acid.

4. A composition for salting and stabilizing fat-containing foods against rancidity comprising crystalline common salt having the surfaces thereof coated with a thin layer of a partially stearated polyhydroxy alcohol having an effective amount of nordihydroguaiaretic acid dissolved therein.

5. A composition for salting and stabilizing fat-containing foods against rancidity development comprising approximately 98% common salt having the surfaces thereof coated with about 1% of a mixture consisting of nordihydroguaiaretic acid and a normally solid monoglyceride, and not less than about .003% citric acid.

6. A method of making an antioxidant salt which comprises (1) heating glyceryl monostearate to at least 145° F., adding nordihydroguaiaretic acid to the melted monostearate in an amount sufficient to form a mixture containing about 80% monostearate and about 20% nordiguaiaretic acid and then cooling the solution to solidification; (2) heating flake flour salt to between about 145° F. and 160° F. and adding thereto an amount of the said glyceryl monostearate-nordihydroguaiaretic acid mixture sufficient to provide a composition having about 7.5% of the glyceryl monostearate nordihydroguaiaretic acid mixture and about 92.5% of flake flour salt, said addition being made with agitation; (3) heating about 98 parts flake flour salt to between about 145° F.–160° F. and adding thereto about 1 part of the mixture resulting from step 2 and not less than 0.003% citric acid, and agitating the mixture until a temperature of 140° F. or lower is obtained.

7. A method of making an antioxidant composition which comprises coating common salt with a mixture comprising glyceryl monostearate and nordihydroguaiaretic acid.

CLINTON S. ROBISON.

References Cited in the file of this patent

UNITED STATES PATENTS

| Number | Name | Date |
|---|---|---|
| 2,032,612 | Griffith et al. | Mar. 3, 1936 |

OTHER REFERENCES

"Stabilization of Iodine in Salt and Feedstuffs," Johnson and Frederick, Science 92, 315 (1940) #2388. (Abstract in Squibb Abstract Bulletin, volume 13, A-1420.)

"A Study of the Antioxidant Effectiveness of Several Compounds on Vegetable Fats and Oils," Mattil et al., Oil and Soap, June 1944, pages 160 and 161.

"Effect of Deodorization and Antioxidants on the Stability of Lard," Riemenschneider et al., Oil and Soap, October 1944, pages 307–309.